United States Patent
Takamatsu et al.

(10) Patent No.: US 10,353,199 B2
(45) Date of Patent: Jul. 16, 2019

(54) DISPLAY DEVICE

(71) Applicant: YAZAKI CORPORATION, Tokyo (JP)

(72) Inventors: Masahiro Takamatsu, Shizuoka (JP); Masahide Nagata, Shizuoka (JP); Takao Kanai, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 102 days.

(21) Appl. No.: 15/285,977

(22) Filed: Oct. 5, 2016

(65) Prior Publication Data

US 2017/0097504 A1   Apr. 6, 2017

(30) Foreign Application Priority Data

Oct. 6, 2015  (JP) .................................. 2015-198519

(51) Int. Cl.
*B60K 37/02* (2006.01)
*G02B 27/01* (2006.01)
(Continued)

(52) U.S. Cl.
CPC .......... *G02B 27/0101* (2013.01); *B60K 35/00* (2013.01); *B60K 37/00* (2013.01); *B60K 37/02* (2013.01); *G02B 27/0149* (2013.01); *B60K 2370/154* (2019.05); *B60K 2370/28* (2019.05); *B60K 2370/334* (2019.05); *B60K 2370/339* (2019.05); *B60K 2370/70* (2019.05); *G02B 2027/0132* (2013.01); *G02B 2027/0154* (2013.01)

(58) Field of Classification Search
None
See application file for complete search history.

(56) References Cited

U.S. PATENT DOCUMENTS 4,664,475 A * 5/1987 Ferrer ..................... B64D 43/00
                                                     244/129.1
4,747,672 A * 5/1988 Yasuhara ............ G02B 27/0101
                                                        349/58
(Continued)

FOREIGN PATENT DOCUMENTS

JP    2002-209162 A    7/2002
JP    2005-35406 A     2/2005
(Continued)

OTHER PUBLICATIONS

Japanese Office Action for the related Japanese Patent Application No. 2015-198519 dated Nov. 7, 2017.
(Continued)

*Primary Examiner* — Robert E. Tallman
*Assistant Examiner* — Gary W O'Neill
(74) *Attorney, Agent, or Firm* — Kenealy Vaidya LLP

(57) ABSTRACT

An HUD unit is equipped with a first display and a second display. The light irradiating directions of the first display and the second display are adjusted so that the first image irradiated from the first display, reflected by the front window of a vehicle and visually recognized by the driver of the vehicle and the second image irradiated from the second display to the eye point of the driver and visually recognized by the driver are visually recognized in a state of being arranged side by side.

14 Claims, 12 Drawing Sheets

(51) Int. Cl.
    *B60K 35/00*   (2006.01)
    *B60K 37/00*   (2006.01)

(56) References Cited

U.S. PATENT DOCUMENTS

| | | | |
|---|---|---|---|
| 2002/0089756 A1 | 7/2002 | Aoki et al. | |
| 2011/0122049 A1 | 5/2011 | Lvovskiy et al. | |
| 2011/0175798 A1* | 7/2011 | Sato | B60K 35/00 345/7 |
| 2015/0234185 A1* | 8/2015 | Inomata | G02B 5/0247 359/599 |
| 2016/0004076 A1 | 1/2016 | Matsubara et al. | |
| 2016/0054564 A1 | 2/2016 | Han | |
| 2016/0202479 A1 | 7/2016 | Okayama et al. | |

FOREIGN PATENT DOCUMENTS

| | | |
|---|---|---|
| JP | 2006-259043 A | 9/2006 |
| JP | 2008-68767 A | 3/2008 |
| JP | 2008-290685 A | 12/2008 |
| JP | 2010-164941 A | 7/2010 |
| JP | 2011-105306 A | 6/2011 |
| JP | 2013-111999 A | 6/2013 |
| JP | 2013-112269 A | 6/2013 |
| JP | 2013-159172 A | 8/2013 |
| JP | 2014-43205 A | 3/2014 |
| JP | 2015-104930 A | 6/2015 |
| JP | 2016-60250 A | 4/2016 |
| WO | 2015/079654 A1 | 6/2015 |

OTHER PUBLICATIONS

Japanese Office Action for the related Japanese Patent Application No. 2015-198519 dated May 29, 2018.
An English translation of Abstract and Paragraph [0058] of JP-A-2010-164941(we cited in Jan. 27, 2017 IDS) as its Supporting documents.
Chinese Office Action for the related Chinese Patent Application No. 201610875670.7 dated Nov. 5, 2018.

* cited by examiner

DISPLAY DEVICE

CROSS REFERENCE TO RELATED APPLICATIONS

This application is based on and claims priority from Japanese patent application No. 2015-198519 filed on Oct. 6, 2015, the entire contents of which are incorporated herein by reference.

BACKGROUND OF THE INVENTION

1. Technical Field

The present invention relates to a display device for displaying information.

2. Background Art

Conventionally, head-up display (HUD) units for projecting images onto the front window of a vehicle have been known as devices for displaying images around the sight line of the driver of the vehicle (refer to Patent Document JP-A-2011-105306). Furthermore, HUD units having a combiner and being used to project images onto the combiner have also been known (refer to Patent Document JP-A-2015-104930).

SUMMARY

In the case of such a conventional HUD unit, an image is projected onto the front window or the combiner, and the image projected onto the front window or the combiner is visually recognized by the driver. However, in the case that an image different from the image projected by the HUD unit is enabled to be visually recognized by the driver, it is necessary to display the image on a display unit different from the HUD unit, but it is difficult to adopt such a display unit in view of space saving and design.

The present invention has been made in consideration of the above-mentioned circumstances, and an object of the present invention is to provide a display device capable of presenting both a projected image and a displayed image to the occupant of a vehicle.

To attain the above-mentioned object, the display device according to the present invention is characterized as described in the following items (1) to (6).
(1) A display device, comprising
 a first display section for irradiating light to the windshield of a vehicle and
 a second display section for irradiating light to an occupant of the vehicle, wherein
 light irradiating directions of the first display section and the second display section are set to the directions in which the first image irradiated from the first display section, reflected by the windshield and visually recognized by the occupant and the second image irradiated from the second display section to the eye point of the occupant and visually recognized by the occupant are visually recognized in a state of being arranged side by side.
(2) The display device described in the above-mentioned item (1), further comprising
 a control section for controlling the display produced by the first display section and the display produced by the second display section, wherein
 the control section relates the content of the display produced by the first display section to the content of the display produced by the second display section.
(3) The display device described in the above-mentioned item (1), wherein
 the first display section is implemented as a pair of display sections installed on the left and right sides.
(4) The display device described in the above-mentioned item (1), further comprising
 a surface panel positioned on a front side in the light irradiating direction of the first display section and constituting part of a surface of an instrument panel of the vehicle, wherein
 the surface panel is provided with a plurality of holes formed in a direction connecting the first display section to the windshield.
(5) The display device described in the above-mentioned item (1), further comprising
 a second surface panel positioned on a front side in the light irradiating direction of the second display section, wherein
 the second surface panel is provided with a plurality of holes formed in a direction connecting the second display section to the occupant.
(6) The display device described in the above-mentioned item (4), further comprising
 a second surface panel positioned on a front side in the light irradiating direction of the second display section, wherein
 the second surface panel is provided with a plurality of holes formed in a direction connecting the second display section to the occupant, and the surface panel and the second surface panel are integrally formed.

With the display device configured as described in the above-mentioned item (1), both the projected image and the displayed image can be presented to the occupant. Furthermore, since the first image and the second image are displayed so as to be visually recognized in a state of being arranged side by side, the method of presenting information to the occupant can be changed variously and the information can be displayed effectively. Moreover, even if only the single HUD unit is used, images can be presented to the driver by using two display methods, whereby the display device can produce novelty, stylishness and surprise.

With the display device configured as described in the above-mentioned item (2), since the projected image and the displayed image are related mutually, the driver can get more useful information by visually recognizing the two images.

With the display device configured as described in the above-mentioned item (3), since the display device is implemented as a pair of display devices installed on the left and right sides, the driver can easily understand the driving states of the vehicle and can drive conveniently and safely according to the driving information to be displayed on the left and right display devices.

With the display device configured as described in the above-mentioned item (4), since the display device is installed so as to form part of the surface of the instrument panel without protruding from the surface of the instrument panel, the surface of the instrument panel is smooth, and the design property and the attractive appearance of the instrument panel can be maintained. Moreover, since the display device does not have a member such as a hood for shielding outdoor light, the degree of freedom in design is increased.

With the display device configured as described in the above-mentioned item (5), since the second display section is covered with the second surface panel so as to be hidden completely, the surface of the instrument panel can be made further smoother and the attractive appearance of the instrument panel can be maintained.

With the display device configured as described in the above-mentioned item (6), since the surface panel and the second surface panel are formed of a single plate, the integrated panel is superior in design property.

With the present invention, both the projected image and the displayed image can be presented to the occupant.

The present invention has been described above briefly. Moreover, the details of the present invention will be further clarified by reading the descriptions of the modes (hereafter referred to as "embodiments") for embodying the invention to be described below by referring to the accompanying drawings.

BRIEF DESCRIPTION OF THE DRAWINGS

FIG. 5A is a view showing an example of the display at the time of turning left, and FIG. 5B is a view showing an example of the display at the time of turning right;

DETAILED DESCRIPTION OF EMBODIMENTS

Specific embodiments according to the present invention will be described below referring to the accompanying drawings.

First Embodiment

Figure 1:
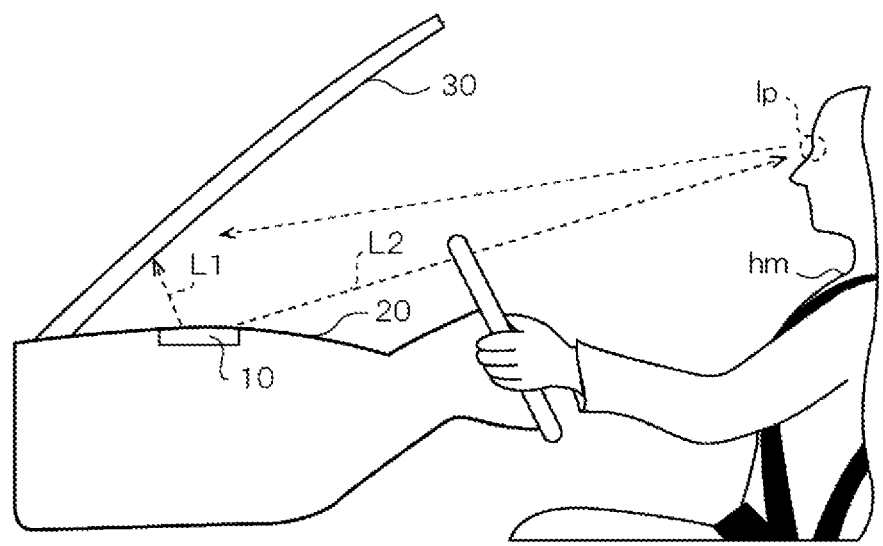
FIG. 1 is a view showing a region in the vicinity of an instrument panel in the case that the inside of the vehicle compartment on the side of the driver's seat of a vehicle according to a first embodiment is viewed from the side.

FIG. 1 is a view showing a region in the vicinity of an instrument panel 20 in the case that the inside of the vehicle compartment on the side of the driver's seat of a vehicle according to a first embodiment is viewed from the side. A head-up display (HUD) unit 10 is installed on the vehicle front side of the instrument panel 20 so as to face the driver hm sitting in the driver's seat with the steering wheel placed therebetween.

Figure 2:
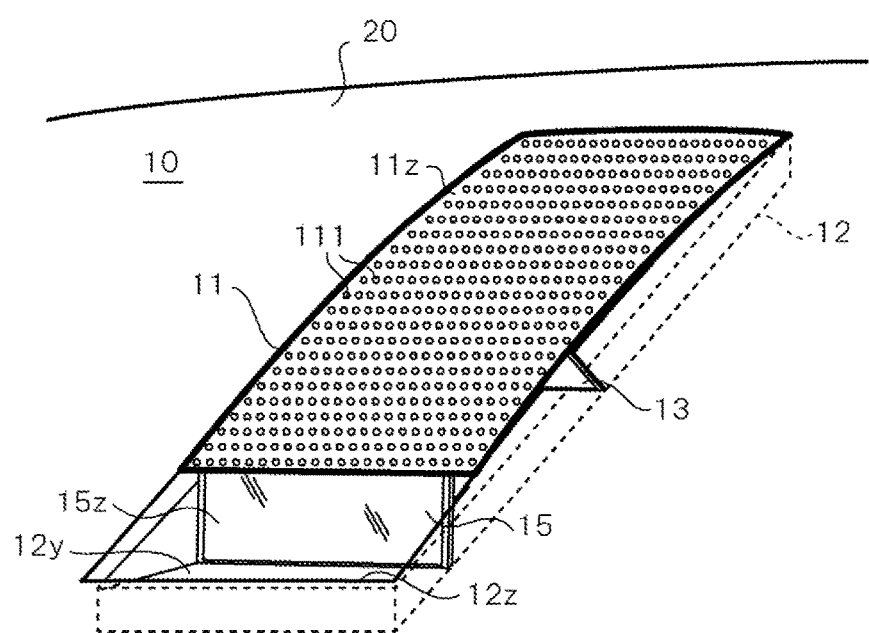
FIG. 2 is a perspective view showing the external appearance of an HUD unit.

FIG. 2 is a perspective view showing the external appearance of the HUD unit 10. The HUD unit 10 has a frame 12 formed into a nearly box-like shape and accommodates therein a first display 13 and a second display 15. The first display 13 is disposed in an inclined state so that the display direction (the direction perpendicular to the display face) thereof is oriented to the front window 30 of the vehicle, thereby projecting images onto the front window 30. The second display 15 is disposed in an inclined state so that the display direction thereof is oriented to the driver's seat, thereby displaying images to the driver sitting in the driver's seat.

Furthermore, the HUD unit 10 has a cover plate 11 disposed on the upper section of the frame 12 so as to cover the first display 13 and the second display 15. Since the cover plate 11 is configured as part of the instrument panel 20, the entire surface of the instrument panel 20 is continuously smooth.

Figure 3:
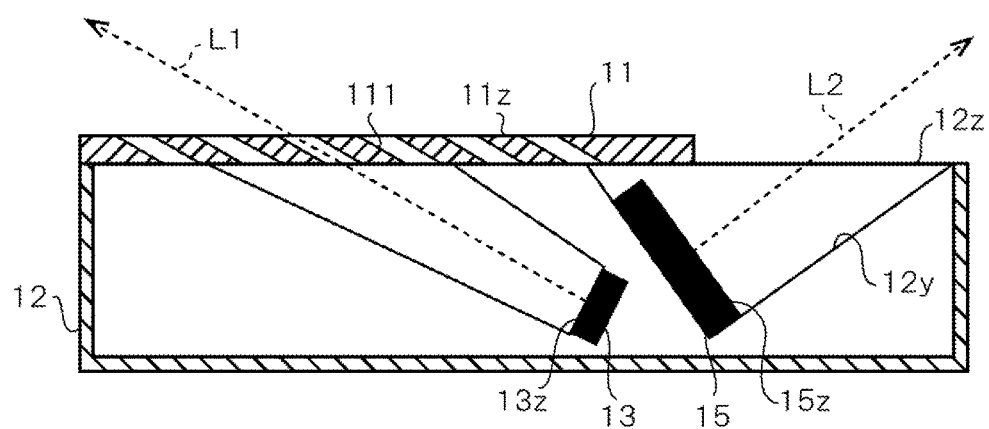
FIG. 3 is a cross-sectional view schematically illustrating the structure of the HUD unit.

FIG. 3 is a cross-sectional view schematically illustrating the structure of the HUD unit 10. The rear end section of the cover plate 11 extends to the side of the driver's seat to the extent of covering the upper section of the second display 15. Numerous pores 111 are formed on the surface 11z of the cover plate 11. The pores 111 are formed so as to have a predetermined angle with respect to the thickness direction of the cover plate 11 and provided in plural in the direction of connecting the first display 13 to the front window 30. The number of the pores 111 is not limited particularly but may be any given number. However, the pores 111 are preferably formed at a density so that, when an image is displayed by the first display 13, the image projected therefrom can be visually recognized by the driver, and so that, when no image is displayed by the first display 13, outdoor light is not so much incident to the inside of the cover plate 11 and the first display 13 becomes dark to the extent that the driver cannot visually recognize the first display 13 directly or via the front window 30.

The inclination of the pore 111 is determined by the positional relationship between the display face 13z of the first display 13 and the projection area DA (refer to FIG. 4) of the front window 30. The image at the lower part of the display face 13z is displayed at the lower part of the projection area DA. Furthermore, the light from the lower part of the display face 13z passes through the pores 111 formed on the front side of the cover plate 11, whereby the inclination (the inclination with respect to the thickness direction) of the pores 111 formed on the front side is large. On the other hand, the image at the upper part of the display face 13z is displayed at the upper part of the projection area DA. Furthermore, the light from the upper part of the display face 13z passes through the pores 111 formed on the rear side of the cover plate 11, whereby the inclination (the inclination with respect to the thickness direction) of the pores 111 formed on the rear side is small. Hence, the direction of the light projected by the first display 13 onto the front window 30 is limited to the direction indicated by a light beam L1, and the image projected onto the front window 30 by the first display 13 fits within the projection area DA inside the front window 30.

Moreover, although the cover plate 11 covers the upper section of the second display 15, the display face 15z of the second display 15 is exposed. In other words, the second display 15 is disposed at a position recessed from the opening section 12z formed in the frame 12. In addition, a tapered face 12y is formed in the frame 12 extending from the display face 15z of the second display 15 to the opening section 12z. The direction of the light projected by the second display 15 is the direction indicated by the light beam L2 propagating along the tapered face 12y, and nothing is present to block the space between the display face 15z of the second display 15 and the visual line position of the driver. Hence, the driver can visually recognize the image displayed on the display face 15z of the second display 15 easily.

As shown in FIG. 1, the directions of the light beams L1 and L2 irradiated from the first display 13 and the second display 15 respectively are adjusted so that the first image irradiated from the first display 13, reflected by the front window 30 and visually recognized at the eye point (visual point) IP of the driver hm and the second image irradiated from the second display 15 to the eye point IP (visual point) of the driver hm and visually recognized by the driver hm are visually recognized in a state of being arranged side by side in the vertical direction. However, the first and second images are not limited to be arranged side by side in the vertical direction but may be arranged side by side in other directions. The images may merely be displayed at positions where the driver can visually recognize the images simultaneously.

Figure 4:
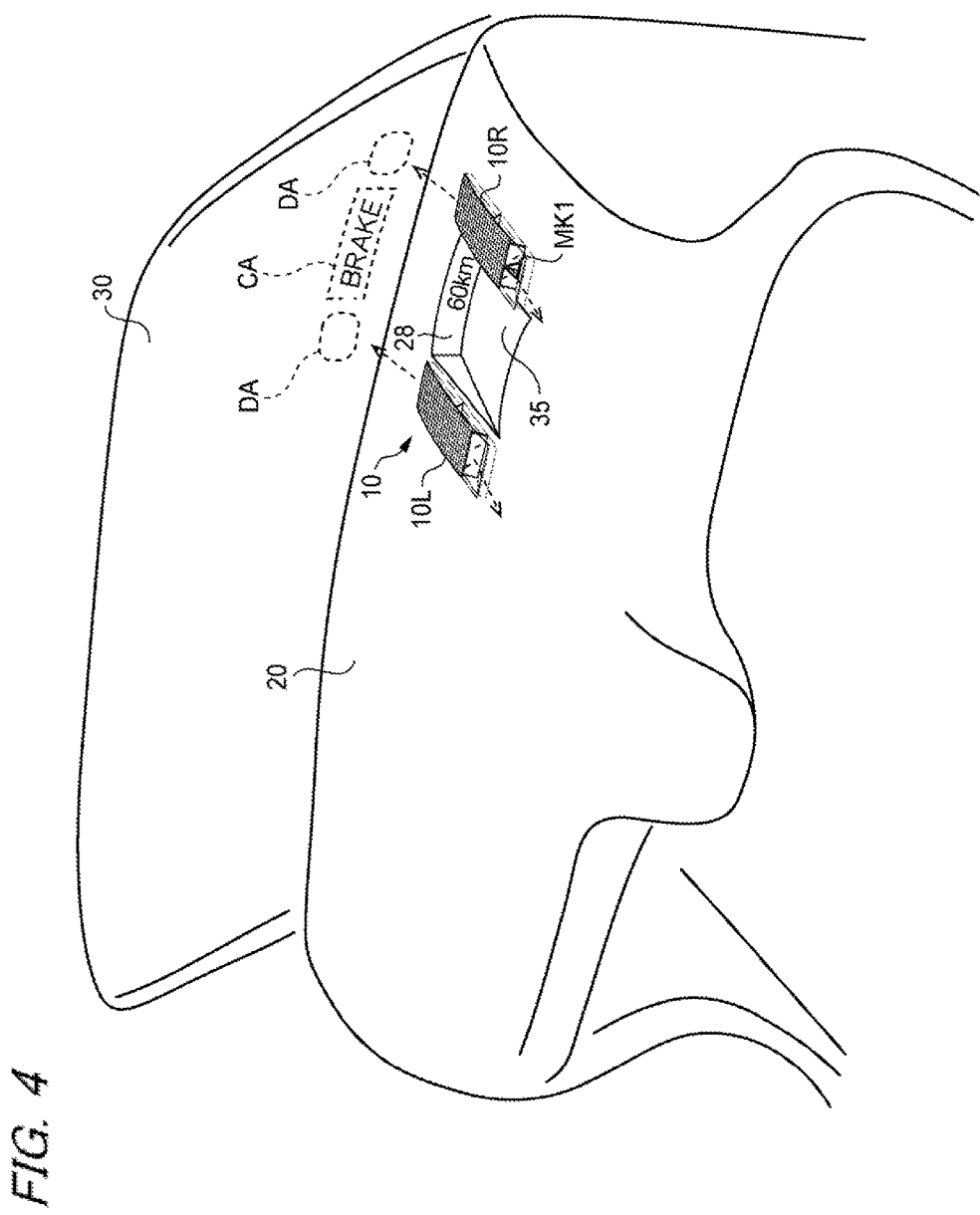
FIG. 4 is a view showing the external appearance of the inside of the vehicle compartment on the side of the driver's seat, including the instrument panel in which the HUD unit is installed.

FIG. 4 is a view showing the external appearance of the inside of the vehicle compartment on the side of the driver's seat, including the instrument panel 20 in which the HUD unit 10 is installed. In this configuration, the HUD unit 10 is implemented as a left and right pair of HUD units 10 installed with a center HUD 35 placed therebetween on the instrument panel 20 on the side of the driver's seat. In the case that the left and right pair of HUD units is particularly required to be distinguished from each other, the HUD unit on the left side as viewed from the driver's seat is referred to as the HUD unit 10L, and the HUD unit on the right side is referred to as the HUD unit 10R. However, the number of the HUD units is not limited to two but may be one or may be three or more. Furthermore, the HUD units are not limited to be installed in the instrument panel on the side of the driver's seat but can be installed in the instrument panel on the side of the front passenger's seat.

Moreover, a display panel 28 is installed between the left and right pair of HUD units 10. In the figure, the display panel 28 is installed on the side wall (the rising wall on the front side of the vehicle) of the center HUD 35 and indicates, for example, a legal speed (herein, 60 km/h). A meter panel may be installed on the near side of the instrument panel 20 on the side of the driver's seat. In this case, a speedometer, an engine tachometer, direction indicators, etc. are displayed on the meter panel.

The left and right pair of HUD units 10 is connected, for example, to an ECU (electronic control unit) installed in the instrument panel 20, and performs display operation according to instructions from the ECU. The HUD units may be controlled by a control unit (control section), such as a control unit (including the ECU) for controlling the panel meter and the like or may be controlled by a control unit dedicated to the HUD units. Furthermore, the HUD units may be controlled by a control unit for controlling both the HUD units 10 and the center HUD 35. In any of these cases, the control unit inputs driving data representing the driving states (vehicle speed, G-value (acceleration), inter-vehicle distance, etc.) of the vehicle through an on-vehicle network or the like. Such a control unit 40 (not including a drive mechanism 41) as shown in FIG. 7B, described later, is installed for the HUD units 10 as the control unit dedicated to the HUD units.

A "BRAKE" image for urging the driver to perform braking operation is projected onto the projection area CA of the front window 30 by the center HUD 35. In addition, by the left and right pair of first displays 13 incorporated in the left and right pair of HUD units 10, circular images (first images) are projected onto the projection areas DA respectively provided on the left and right sides of the projection area CA of the front window 30 to attract the driver's attention. The circular images are displayed in color, for example, blue or yellow, within the range covered by regulations to attract the driver's attention.

Furthermore, in the case of the state shown in the figure, although the second display 15L incorporated in the left HUD unit 10L does not display anything, the second display 15R incorporated in the right HUD unit 10R displays the image (second image) of a danger mark MK1 attracting the driver's attention. Since the "BRAKE" image, the circular images displayed on the left and right sides of the "BRAKE" image and the image of the danger mark MK1 are displayed in the vertical direction so as to be related mutually, the driver can sufficiently recognize the current driving states.

Figure 5A:
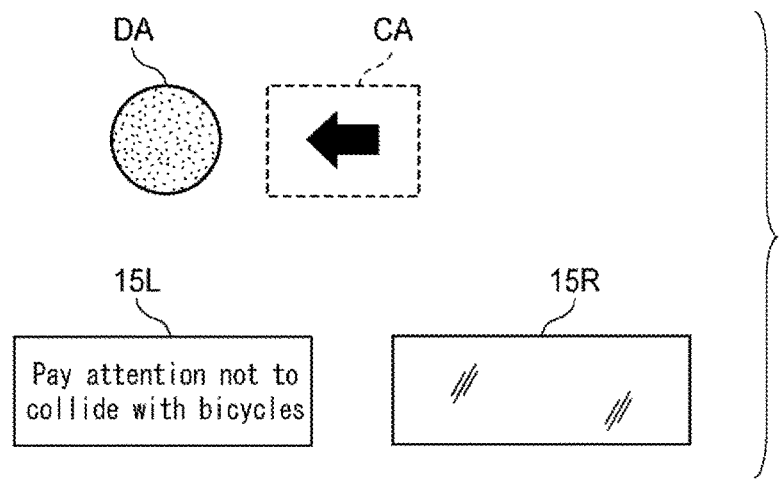
FIGS. 5A and 5B are views showing other examples of the display by a left and right pair of HUD units.
Figure 5B:
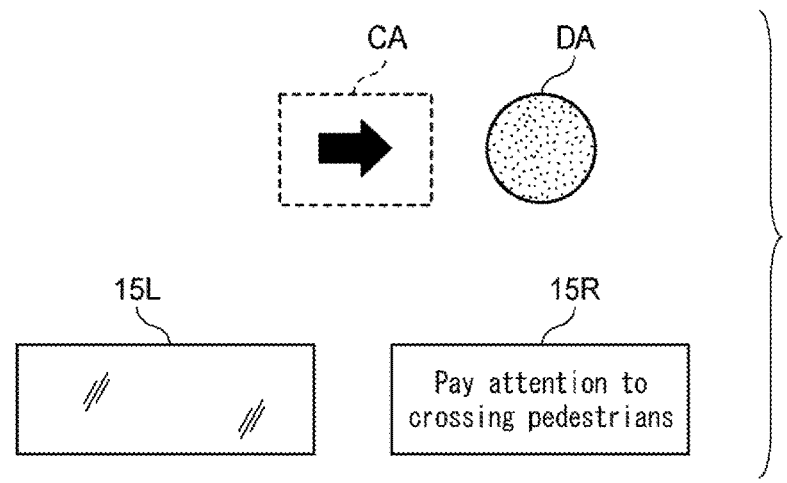

FIGS. 5A and 5B are views showing other examples of the display by the center HUD 35 and the left and right pair of HUD units 10. FIG. 5A is a view showing an example of the display at the time of turning left. For example, when the driver has operated the left turn indicator (at the time of turning left), the center HUD 35 projects the image of the left turn indicator. In addition, the first display 13L of the left HUD unit 10L projects the circular color image onto the front window 30, and the first display 13R of the right HUD unit 1 OR is turned off. Furthermore, the second display 15L of the left HUD unit 10L displays a message saying "Pay attention not to collide with bicycles" and the second display 15R of the right HUD unit 10R does not display anything. Hence, the driver sees these indications at the time of turning left and is aware of the matter that must be paid attention to at the time of turning left. As described above, the indications can attract the driver's attention so as not to collide with bicycles at the time of turning left. This leads to an improvement in safe driving.

FIG. 5B is a view showing an example of the display at the time of turning right. For example, when the driver has operated the right turn indicator (at the time of turning right), the center HUD 35 projects the image of the right turn indicator. In addition, the first display 13R of the right HUD unit 10R projects the circular color image on the front window 30, and the first display 13L of the left HUD unit 10L is turned off. Furthermore, the second display 15R of the right HUD unit 10R displays a message saying "Pay attention to crossing pedestrians" and the second display 15L of the left HUD unit 10L does not display anything. Hence, the driver sees these indications at the time of turning right and is aware of the matter that must be paid attention to at the time of turning right. As described above, the indications can attract the driver's attention so as to pay attention to crossing pedestrians at the time of turning right.

In the HUD unit 10 according to the first embodiment, in addition to the projection onto the front window (windshield) 30 of the vehicle by the center HUD 35, the first display (first display section) 13 irradiates light to the front window (windshield) 30. Furthermore, the second display 15 irradiates light to the driver (occupant) hm of the vehicle. The cover plate (surface panel) 11 is positioned on the front side of the vehicle, thereby forming part of the surface of the instrument panel 20. The cover plate 11 is provided with the plurality of pores (holes) 111 along the direction connecting the first display 13 to the front window 30. The light irradiating directions of the first display 13 and the second display 15 are adjusted so that the first image irradiated from the first display 13, reflected by the front window 30 and visually recognized by the driver hm and the second image irradiated from the second display 15 to the eye point Ip (visual point) of the driver hm and visually recognized by the driver are visually recognized in a state of being arranged side by side in the vertical direction.

As described above, in the HUD unit 10 according to the first embodiment, both the projected image and the displayed image can be presented to the driver. Furthermore, since the HUD unit is installed so as to form part of the surface of the instrument panel without protruding from the surface of the instrument panel, the surface of the instrument panel is smooth, and the design property and the attractive appearance of the instrument panel can be maintained. Moreover, since the HUD unit does not have a member such as a hood for shielding outdoor light, the degree of freedom in design is increased. What's more, even if only the single HUD unit is used, images can be presented to the driver by using a plurality of display methods, whereby the HUD unit can produce novelty, stylishness and surprise. Still further, since the left and right pair of HUD units is disposed on the left and right sides of the center HUD 35, the driver can easily understand the driving states and can drive conveniently and safely according to the driving information displayed on the left and right HUD units. More and more, since the projected image and the displayed image are related mutually, the driver can get more useful information by visually recognizing the two images.

The present invention can provide the HUD unit in which the first display for projecting an image onto the front window and the second display for displaying an image to the driver are integrated as described above. Hence, the HUD unit can provide information to be presented to the driver by using the dual display. Additionally, since the HUD unit is covered with the cover plate, the driver cannot recognize the existence of the first display and the second display when they are turned off but can recognize the existence of them only when they are turned on, whereby the performance effect of the HUD unit can be enhanced. Moreover, even if numerous HUD units are disposed in the vicinity of the instrument panel, the surface of the instrument panel is kept smooth, and the attractive appearance of the instrument panel can be maintained.

It may be possible that the left HUD unit 10L and the right HUD unit 10R are installed so that the steering wheel is placed between them as viewed from the driver, and that the information to be displayed by the left HUD unit 10L and the right HUD unit 10R and the information to be displayed by the display unit installed on the steering wheel are related mutually.

(Modification of First Embodiment)

Although the HUD unit is fixed and stationary in the first embodiment, the cover plate of an HUD unit according to a modification of the first embodiment is movable up and down.

Figure 6:
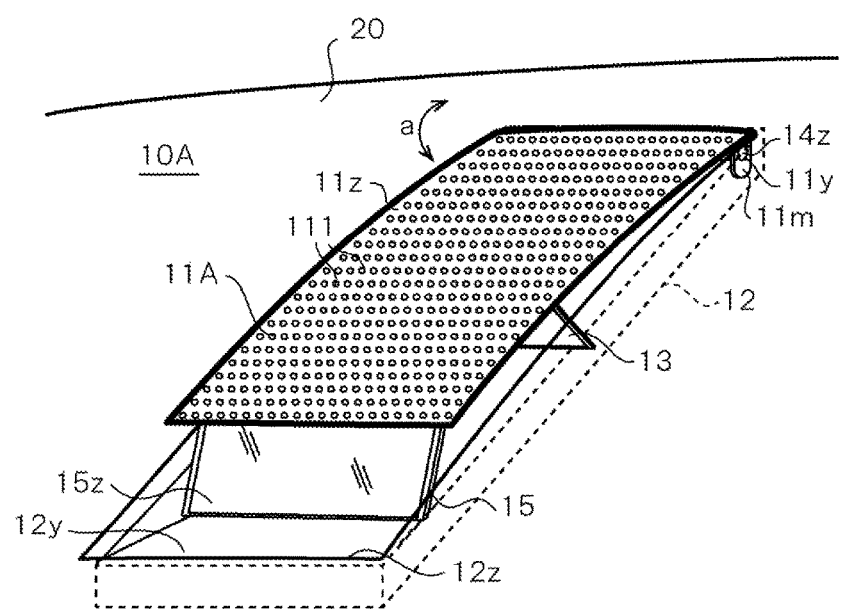
FIG. 6 is a view showing the external appearance of an HUD unit according to a modification.

FIG. 6 is a view showing the external appearance of an HUD unit 10A according to the modification. On the front end side (the deep side in the figure) of the cover plate 11A of the HUD unit 10A, a hinge mechanism composed of a rotation shaft 14z pivotally supported on the wall face of the frame 12 in the horizontal direction and protrusion pieces 11m protruding from the front end sections of the cover plate 11A and having hole sections 11y into which the rotation shaft 14z is inserted is provided. When the protrusion pieces 11m are rotated around the rotation shaft 14z, the cover plate 11A performs lift-up operation.

Furthermore, the second display 15A of the HUD unit 10A is fixed (connected) to the cover plate 11A. When the cover plate 11A performs the lift-up operation, the second display 15A is moved up and down together with the cover plate 11A. When the cover plate 11A is moved up and down, the inclination of the second display 15A is changed and the display direction thereof is changed. In other words, the visibility of the driver is improved by aligning the display direction of the second display 15A with the visual line direction (sight line direction) of the driver.

The first display 13A of the HUD unit 10A may remain fixed to the frame 12 without being connected to the cover plate 11A or may be fixed to the cover plate 11A so as to be moved up and down together with the cover plate 11A.

Figure 7A:
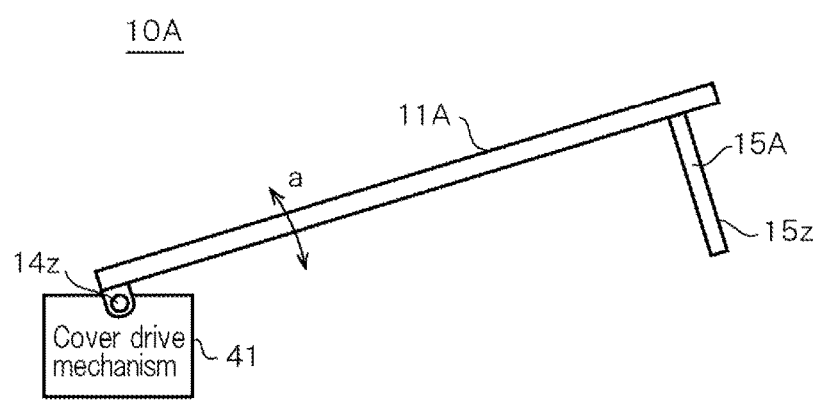
FIG. 7A is a view illustrating the outline of the drive mechanism of a cover plate.
Figure 7B:
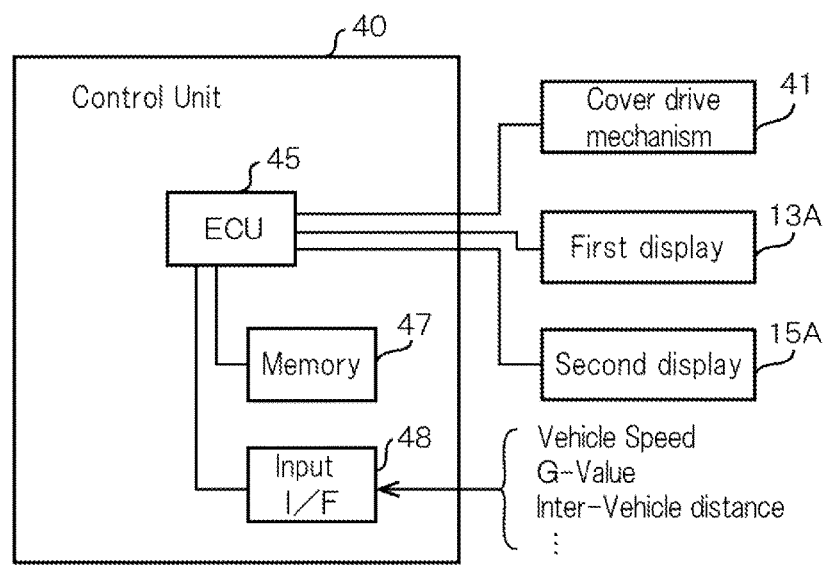
FIG. 7B is a block diagram showing the configuration of a control unit.

FIG. 7A is a view illustrating the outline of the drive mechanism of the cover plate 11A. The HUD unit 10A has a cover drive mechanism 41 for rotating the cover plate 11A around the rotation shaft 14z. The cover drive mechanism 41 incorporates a motor and gears and drives the gear pivotally supported by the rotation shaft 14z by using the drive power of the motor transmitted via the gears, thereby rotating the cover plate 11A.

Since the second display 15A is fixed to the rear end section (the near side in FIG. 6), the position of the second display 15A and the inclination of the display face 15z thereof are changed by changing the opening degree of the cover plate 11A. Hence, in the case that the display direction (the inclination of the direction perpendicular to the display face) of the second display 15A deviates from the sight line direction of the driver, the display direction can be adjusted so as to be aligned with the sight line direction of the driver by changing the opening degree of the cover plate so that the display by the first display 13A fits within a predetermined area.

The cover drive mechanism 41 may be controlled, for example, by a control unit (including the ECU) for controlling the panel meter and the like installed on the instrument panel or may be controlled by a control unit dedicated to the HUD unit. In both cases, the control unit inputs driving data representing the driving states (vehicle speed, G-value (acceleration), inter-vehicle distance, etc.) of the vehicle. A case in which the control unit dedicated to the HUD unit is used is taken as an example. The control unit 40 (refer to FIG. 7B) is installed in the HUD unit 10A.

FIG. 7B is a block diagram showing the configuration of the control unit 40. The control unit 40 has an ECU 45, a memory 47 and an input I/F 48. The ECU 45 incorporates a CPU, a ROM, etc. and totally controls the respective sections of the HUD unit 10A. In addition to the memory 47 and the input I/F 48, the first display 13A, the second display 15A and the cover drive mechanism 41 are connected to the ECU 45.

The memory 47 stores operation programs to be executed by the ECU 45, display data, etc. The memory 47 also stores the lift-up amount (display angle) of the cover plate 11A corresponding to the visual line position of the driver sitting in the driver's seat. The lift-up amount can be set arbitrarily by the driver by operating the operation switch (for example, a steering switch) connected to the input I/F 48. In addition, driving data, such as the vehicle speed, G-value and inter-vehicle distance measured by other control units, is input to the input I/F 48.

As described above, in the HUD unit 10A according to the modification, the inclination of the display face 15z of the second display 15A can be adjusted so as to be aligned with the sight line direction of the driver, whereby the visibility of the driver is improved.

Second Embodiment

In the first embodiment described above, the cover plate 11 is not provided on the display face side of the second display 15, and the display face 15z is opened (exposed) by the opening section 12z formed in the frame 12. However, the second display of an HUD unit 10B according to a second embodiment is completely covered.

Figure 8:
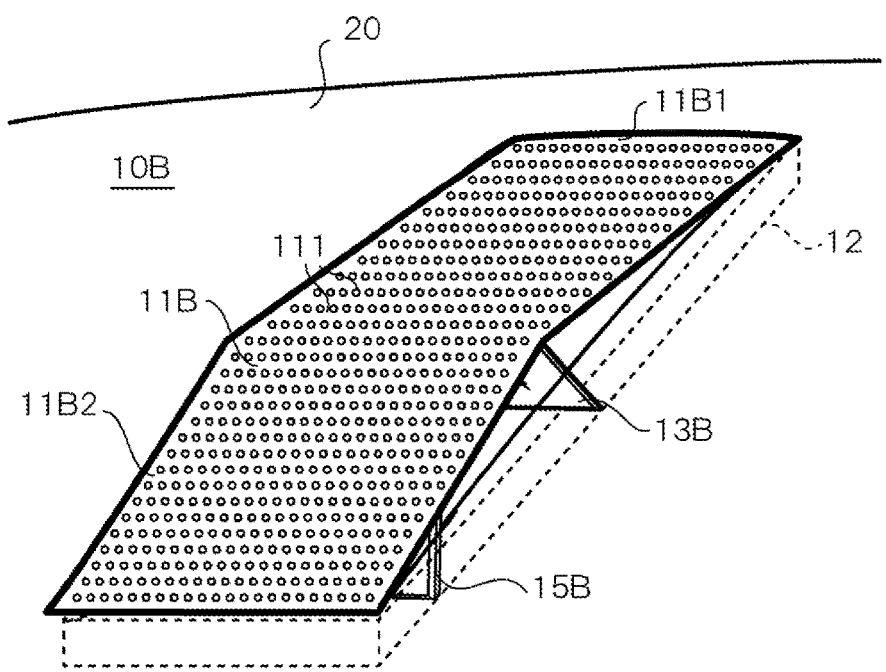
FIG. 8 is a perspective view showing the external appearance of an HUD unit according to a second embodiment.

In the HUD unit 10B according to the second embodiment, the same components as those of the HUD unit according to the first embodiment are designated by the same numerals and their descriptions are omitted. FIG. 8 is a perspective view showing the external appearance of the HUD unit 10B according to the second embodiment.

The cover plate 11B of the HUD unit 10B is formed into a chevron shape and divided into a cover plate 11B1 opposed to a first display 13B and a cover plate 11B2 opposed to a second display 15B. The cover plate 11B2 closes the opening section 12z of the frame 12 by covering the opening section.

Furthermore, since the cover plate 11B is formed into a chevron shape, when installed on the instrument panel 20, the cover plate 11B protrudes from the smoothly curved face of the instrument panel 20. Since the cover plate 11B protrudes in a chevron shape, open spaces are formed on the sides of the cover plate 11B. Although no member is provided on the sides in the configuration shown in the figure, members for covering the spaces can be provided. Since the cover plate 11B is formed as described above, the second display 15B and the first display 13B are hidden by the cover plate 11B, whereby the second display 15B becomes hardly visible directly to the driver when the second display 15B is turned off.

Figure 9:
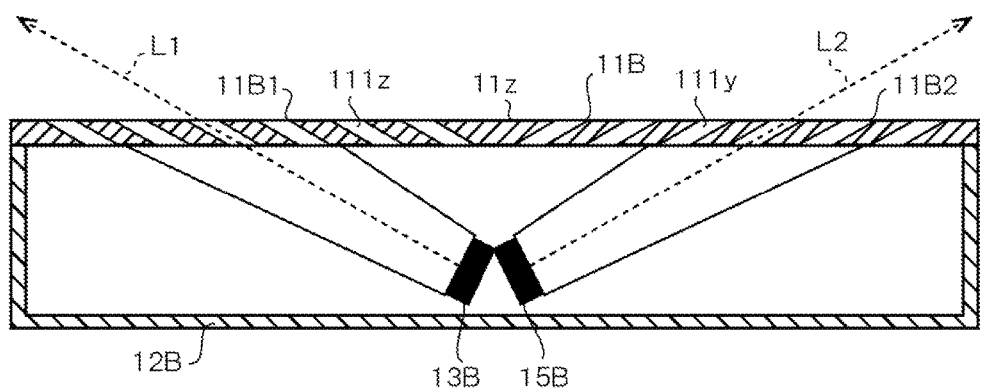
FIG. 9 is a cross-sectional view schematically illustrating the structure of the HUD unit.

FIG. 9 is a cross-sectional view schematically illustrating the structure of the HUD unit 10B. The direction of the pores 111z formed in the cover plate 11B1 opposed to the first display 13B is similar to that in the first embodiment. Numerous pores 111y are formed in the cover plate 11B2 opposed to the second display 15B. The pores 111y are formed while being inclined with respect to the thickness direction of the cover plate 11B2 so that the display direction of the second display 15B is aligned with the sight line direction of the driver, that is, so that the display direction is oriented along the direction connecting the second display 15B to the eye point Ip of the driver hm. The light from the lower part of the display face 15z of the second display 15B passes through the pores 111y formed on the rear side of the cover plate 11B2, whereby the inclination of the pores 111y formed on the rear side is large. On the other hand, the light from the upper part of the display face 15z of the second display 15B passes through the pores 111y formed on the front side of the cover plate 11B2, whereby the inclination of the pores 111y formed on the front side is small. Hence, the direction of the light projected by the second display 15B is limited to the direction indicated by light beam L2, whereby the direction is almost aligned with the sight line direction of the driver.

Figure 10:
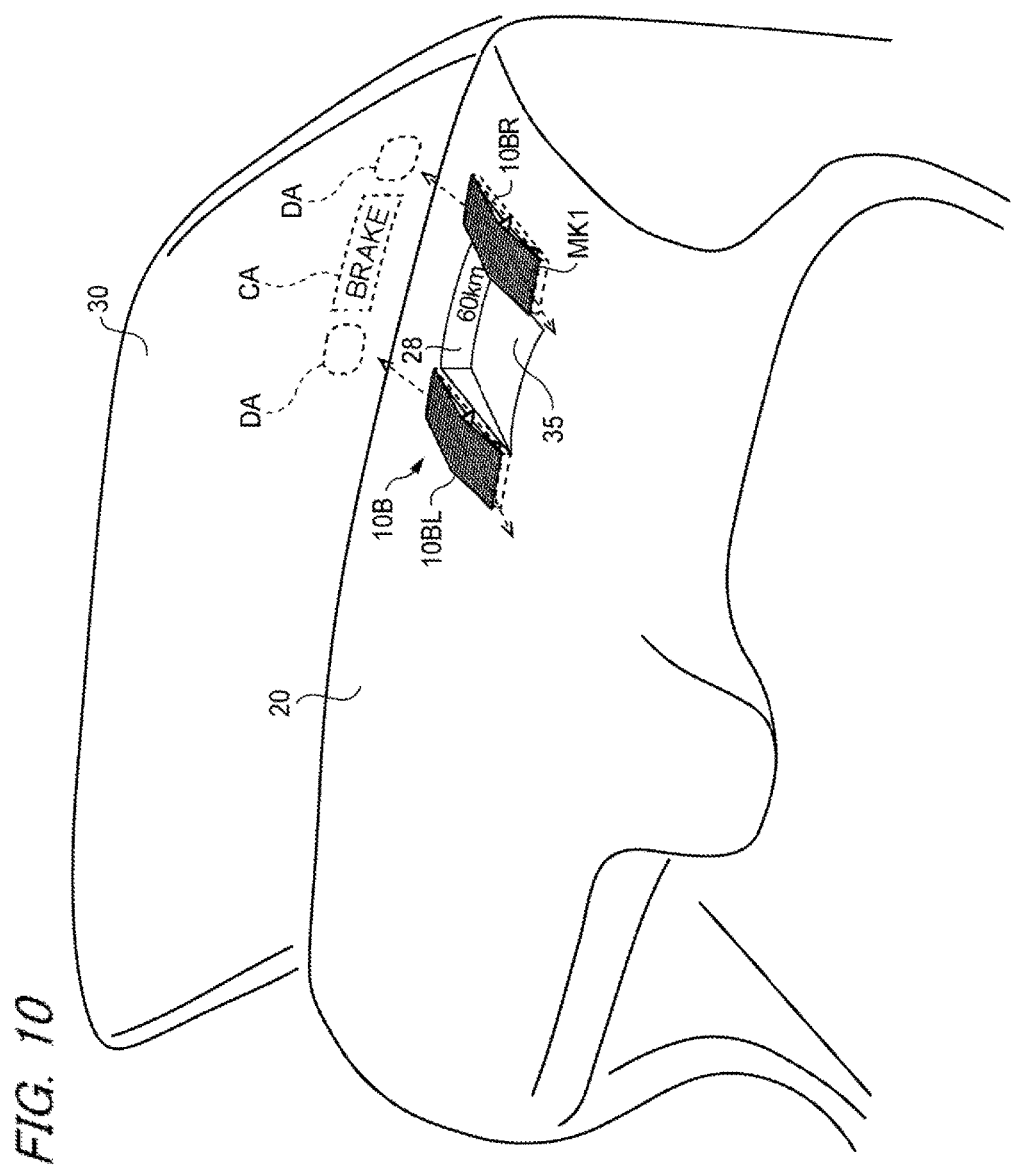
FIG. 10 is a view showing the external appearance of the inside of the vehicle compartment on the side of the driver's seat, including the instrument panel in which the HUD unit is installed.

FIG. 10 is a view showing the external appearance of the inside of the vehicle compartment on the side of the driver's seat, including the instrument panel 20 in which the HUD unit 10B is installed. In this configuration, the HUD unit 10B is implemented as a left and right pair of HUD units disposed with the center HUD 35 placed therebetween on the instrument panel 20 on the side of the driver's seat. In the case that the left and right pair of HUD units is particularly required to be distinguished from each other, the HUD unit on the left side as viewed from the driver's seat is referred to as the HUD unit 10BL, and the HUD unit on the right side is referred to as the HUD unit 10BR. However, the number of the HUD units to be installed is not limited to two but may be one or may be three or more. Furthermore, the HUD units are not limited to be installed in the instrument panel on the side of the driver's seat but can be installed in the instrument panel on the side of the front passenger's seat.

Furthermore, as in the case of the first embodiment described above, the display panel 28 is disposed on the side wall (the rising wall on the front side of the vehicle) of the center HUD 35. The display panel 28 indicates, for example, a legal speed (herein, 60 km/h). As in the case of the first embodiment, a meter panel may be installed on the near side of the instrument panel 20 on the side of the driver's seat.

The left and right pair of HUD units 10B is connected, for example, to the ECU installed in the instrument panel 20, and performs display operation according to instructions from the ECU as in the case of the first embodiment described above.

As described above, in the HUD unit 10B according to the second embodiment, the pores 111y formed in the cover plate 11B2 are used to function as a louver for guiding light to the display direction of the second display 15B. Furthermore, the second display 15B is not visible from the side of the driver's seat and its existence is unknown.

Moreover, the HUD unit 10B according to the second embodiment has the following advantages in addition to advantages similar to those according to the first embodiment described above. Since the second display 15B is covered with the cover plate 11B2 so as to be hidden completely, the surface of the instrument panel can be made further smoother and the attractive appearance of the instrument panel can be maintained. What's more, since the cover plate 11B for covering the first display 13B and the second display 15B is formed of a single plate, the cover plate 11B is superior in design property.

(Modification 1 of Second Embodiment)

Figure 11:
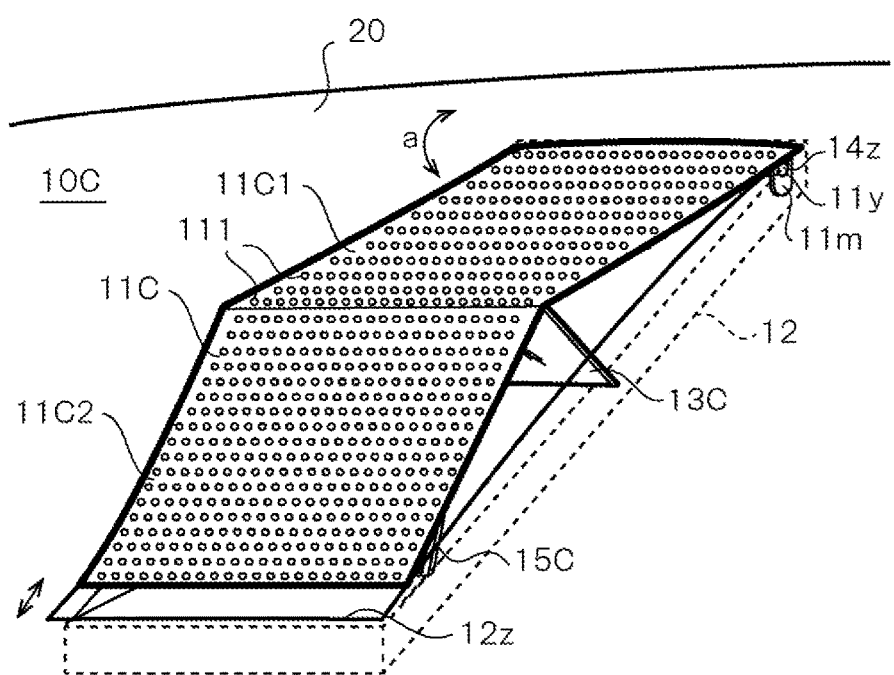
FIG. 11 is a perspective view showing the external appearance of an HUD unit according to modification 1 of the second embodiment.

An HUD unit according to modification 1 of the second embodiment has a structure in which the bulging degree of the cover plate thereof formed into a chevron shape can be changed. FIG. 11 is a perspective view showing the external appearance of an HUD unit 10C according to modification 1 of the second embodiment.

A cover plate 11C is formed of a member that is foldable at its central section. On the surfaces of the cover plate 11C2 on the near side and the cover plate 11C1 on the deep side shown in the figure, the numerous pores 111 are formed as described above. Furthermore, in the case that the cover plate 11C is folded so as to be formed into a chevron shape, the cover plate 11C2 moves in the depth direction in the figure so as to slide along the peripheral sections of the opening section 12z.

In the HUD unit 10C, when the cover plate 11C1 (on the deep side in the figure) is rotated by controlling the cover drive mechanism 41 using the ECU 45, the cover plate 11C is folded at its central section, the near side portion of the cover plate 11C2 slides along the peripheral sections of the opening section 12z while the cover plate 11C2 on the near side rises. Hence, the display direction of the second display 15C of the HUD unit is changed and can be adjusted so as to be aligned with the sight line direction of the driver.

However, it may be possible that the cover plate 11C is driven so as to be formed into a chevron shape only when display is performed and that the cover plate 11C is driven so as to become flat when display is not performed. In the case that the cover plate 11C is driven so as to become flat, the cover plate 11C and the instrument panel 20 can be formed into a continuous flat face, whereby the attractive appearance of the instrument panel can be improved.

(Modification 2 of Second Embodiment)

Figure 12:
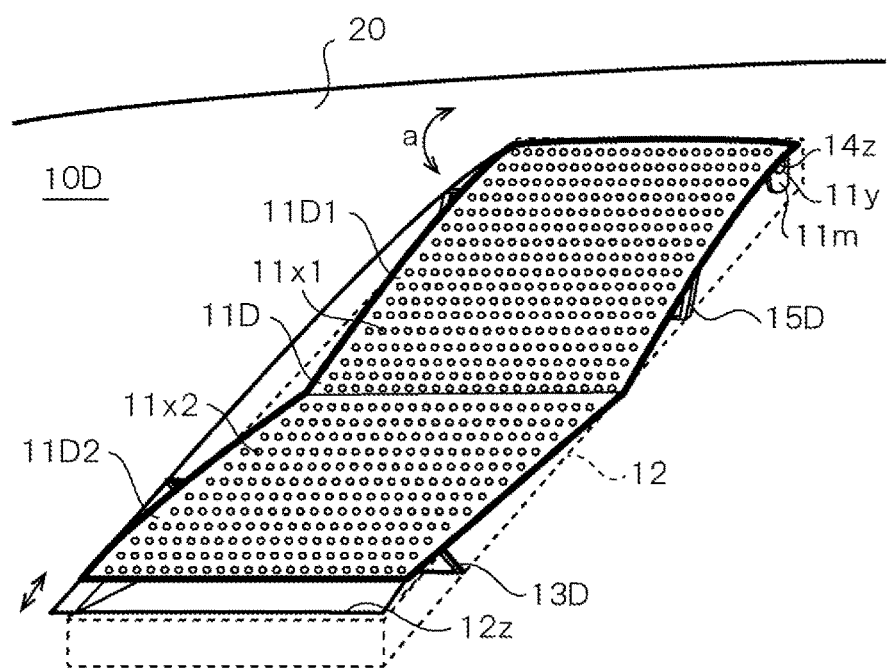
FIG. 12 is a perspective view showing the external appearance of an HUD unit according to modification 2 of the second embodiment.

An HUD unit according to modification 2 of the second embodiment has a structure in which the cover plate thereof is foldable in two portions so as to be formed into a valley shape. FIG. 12 is a perspective view showing the external appearance of an HUD unit 10D according to modification 2 of the second embodiment.

The HUD unit 10D according to modification 2 has a structure almost similar to that according to modification 1, and the cover plate 11D thereof is foldable in two portions so as to be formed into a valley shape. The cover plate 11D is formed of a member being foldable at its central section. When the cover plate 11D is folded so as to be formed into a valley shape, the cover plate 11D2 thereof moves in the depth direction in the figure so as to slide along the peripheral sections of the opening section 12z.

In this case, unlike the case of modification 1, a first display 13D is disposed on the bottom side of the cover plate 11D2 located on the near side. The pores 11x2 to be formed in the cover plate 11D2 are formed so as to incline to the front window 30. Hence, the light from the first display 13D passes through the cover plate 11D2 and is projected to the front window 30. On the other hand, a second display 15D is disposed on the bottom side of the cover plate 11D1 located on the deep side. The pores 11x1 to be formed in the cover plate 11D1 are formed so as to incline to the driver's seat. Hence, the light from the second display 15D passes through the cover plate 11D1 and is propagated in the direction aligned with the sight line direction of the driver.

In the HUD unit 10D, when the cover plate 11D is rotated by controlling the drive mechanism 41 using the ECU 45 so as to be rotated in the direction opposite to that in modification 1, the cover plate 11D is folded at its central section, and the cover plate 11D2 slides along the peripheral sections of the opening section 12z so that the cover plate 11D1 located on the deep side in the figure sinks. Hence, the display direction of the second display 15D is changed and can be adjusted so as to be aligned with the sight line direction of the driver. At this time, the projection direction of the first display 13D to the front window 30 is changed slightly.

The technical scope of the present invention is not limited to the scope described in the above-mentioned embodiments. The above-mentioned embodiments can be changed and improved variously within the technical scope of the present invention.

For example, although the HUD unit is installed in the upper section of the instrument panel on the side of the driver's seat in the above-mentioned embodiments, the HUD unit may be installed in the upper section of the instrument panel on the side of the front passenger's seat. In this case, the HUD unit displays various kinds of information to the occupant sitting in the front passenger's seat.

The characteristics of the display device according to the embodiments of the present invention described above will be briefly summarized and listed in the following items [1] to [6].

[1] A display device being equipped with a first display section (first display 13) for irradiating light to the windshield (front window 30) of a vehicle and a second display section (second display 15) for irradiating light to an occupant (driver hm) of the vehicle, wherein light irradiating directions of the first display section and the second display section are set to the directions in which the first image irradiated from the first display section, reflected by the windshield and visually recognized by the occupant and the second image irradiated from the second display section to the eye point (IP) of the occupant and visually recognized by the occupant are visually recognized in a state of being arranged side by side.

[2] The display device described in the above-mentioned item [1], being further equipped with a control section (control unit 40) for controlling the display produced by the first display section and the display produced by the second display section, wherein the control section relates the content of the display produced by the first display section to the content of the display produced by the second display section.

[3] The display device described in the above-mentioned item [1], wherein the first display section is implemented as a pair of display sections installed on the left and right sides.

[4] The display device described in the above-mentioned item [1], being further equipped with a surface panel (cover plate 11) positioned on a front side in the light irradiating direction of the first display section and constituting part of a surface of an instrument panel of the vehicle, wherein the surface panel is provided with a plurality of holes (pores 111) formed in the direction connecting the first display section to the windshield.

[5] The display device described in the above-mentioned item [1], being further equipped with a second surface panel (cover plate 11B2) positioned on a front side in the light irradiating direction of the second display section, wherein the second surface panel is provided with a plurality of holes (pores 111y) formed in a direction connecting the second display section to the occupant.

[6] The display device described in the above-mentioned item [4], being further equipped with a second surface panel (cover plate 11B2) positioned on a front side in the light irradiating direction of the second display section, wherein the second surface panel is provided with a plurality of holes (pores 111y) formed in a direction connecting the second display section to the occupant, and the surface panel and the second surface panel are integrally formed.

What is claimed is:

1. A display device, comprising
a first display irradiating light to the windshield of a vehicle and
a second display irradiating light to an occupant of the vehicle, wherein
light irradiating directions of the first display and the second display are set to the directions in which the first image irradiated from the first display, reflected by the windshield and visually recognized by the occupant and the second image irradiated from the second display to the eye point of the occupant and visually recognized by the occupant are visually recognized in a state of being arranged side by side, and further comprising
a surface panel positioned on a front side in the light irradiating direction of the first display and constituting part of a surface of an instrument panel of the vehicle, wherein
the surface panel is provided with a plurality of holes formed in a direction connecting the first display to the windshield.

2. The display device according to claim 1, further comprising
a control section for controlling the display produced by the first display and the display produced by the second display, wherein
the control section relates the content of the display produced by the first display to the content of the display produced by the second display.

3. The display device according to claim 1, wherein
the first display is implemented as a pair of display sections installed on the left and right sides.

4. The display device described according to claim 1, further comprising
a second surface panel positioned on a front side in the light irradiating direction of the second display, wherein
the second surface panel is provided with a plurality of holes formed in a direction connecting the second display to the occupant, and the surface panel and the second surface panel are integrally formed.

5. The display device according to claim 4, wherein
the surface panel extends across the first display and the second surface panel extends across the second display,
the holes in the surface panel extend through the surface panel along a first direction and the holes in the second surface panel extend through the second surface panel along a second that is different from the first direction.

6. The display device according to claim 4, wherein
the surface panel and the second surface panel form a chevron shape that protrudes from an adjacent face of the instrument panel.

7. The display device according to claim 4, further comprising
a frame that accommodates each of the first display and the second display therein; and
a rotation shaft connected to each of the surface panel and the frame such that the surface panel is pivotable with respect to the frame, wherein
the second surface panel slides along the frame when the surface panel pivots about the rotation shaft.

8. The display device according to claim 4, wherein
the surface panel and the second surface panel form a valley shape that is recessed below an adjacent face of the instrument panel.

9. The display device according to claim 1, wherein
the surface panel extends from the second display to a location that is beyond the first display such that the surface panel exposes the second display and extends across the first display.

10. The display device according to claim 9, wherein
the first display includes a first display face that faces toward the windshield in a first direction and the first display irradiates light from the first display face, and
the second display includes a second display face that faces a second direction that is different from the first direction and the second display irradiates light from the second face.

11. The display device according to claim 9, wherein
the second display is separate from first display and the second display is spaced away from the first display.

12. The display device according to claim 9, wherein
the first display is located between the second display and the windshield.

13. The display device according to claim 1, further comprising:
a frame that accommodates each of the first display and the second display therein; and
a rotation shaft connected to each of the surface panel and the frame such that the surface panel is pivotable with respect to the frame.

14. The display device according to claim 13, wherein
the second display is connected to the surface panel such that the second display moves with the surface panel when the surface panel pivots about the rotation shaft.

* * * * *